US008325578B2

(12) United States Patent
Nishimura et al.

(10) Patent No.: US 8,325,578 B2
(45) Date of Patent: Dec. 4, 2012

(54) OPTICAL DISC, OPTICAL DISC RECORDING/PLAYBACK APPARATUS, AND INFORMATION RECORDING/PLAYBACK METHOD

(75) Inventors: Koichiro Nishimura, Yokohama (JP); Masaaki Kurebayashi, Ebina (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/995,242

(22) PCT Filed: May 12, 2009

(86) PCT No.: PCT/JP2009/002067
§ 371 (c)(1),
(2), (4) Date: Nov. 30, 2010

(87) PCT Pub. No.: WO2010/038333
PCT Pub. Date: Apr. 8, 2010

(65) Prior Publication Data
US 2011/0096641 A1    Apr. 28, 2011

(30) Foreign Application Priority Data
Sep. 30, 2008 (JP) .................... 2008-253657

(51) Int. Cl.
*G11B 7/00* (2006.01)
(52) U.S. Cl. ............... 369/59.25; 369/47.27
(58) Field of Classification Search ............ 369/53.22, 369/47.27, 59.25, 94, 47.1, 47.28, 275.3, 369/44.37, 53.1
See application file for complete search history.

(56) References Cited

U.S. PATENT DOCUMENTS

| | | | |
|---|---|---|---|
| 5,737,287 A | 4/1998 | Lee | |
| 5,903,531 A | 5/1999 | Satoh et al. | |
| 6,704,262 B2 * | 3/2004 | Shishido et al. | 369/53.22 |
| 7,167,426 B2 * | 1/2007 | Suzuki | 369/47.22 |
| 7,649,819 B2 | 1/2010 | Kim et al. | |
| 7,787,334 B2 | 8/2010 | Kikukawa et al. | |
| 7,830,767 B2 * | 11/2010 | Suh | 369/59.25 |
| 7,978,582 B2 * | 7/2011 | Kim et al. | 369/59.25 |

(Continued)

FOREIGN PATENT DOCUMENTS

JP    09-282785    10/1997

(Continued)

OTHER PUBLICATIONS

Communication mailed by the Japanese Patent Office on Mar. 27, 2012, Japanese Patent Application No. 2008-253657.

*Primary Examiner* — Nabil Hindi
(74) *Attorney, Agent, or Firm* — Antonelli, Terry, Stout & Kraus, LLP.

(57) ABSTRACT

For a disc on which recording is to be performed at a plurality of recording densities, a technique for easily reading out disc management information without an error is disclosed. An optical disc (1) includes a plurality of data recording areas (103,104) for recording information at data recording densities different from each other. Information regarding the data recording densities of the data recording areas (103,104) is recorded in a management information recording area (BCA area (101) or PIC area (102)) in a specific format that does not depend on the data recording densities of the data recording areas (103,104). Each data recording area is divided to be arranged on the same surface of the disc, or is divided and arranged on a plurality of recording layers.

11 Claims, 13 Drawing Sheets

U.S. PATENT DOCUMENTS

| | | | |
|---|---|---|---|
| 8,077,572 B2 * | 12/2011 | Suh et al. | 369/53.21 |
| 8,098,557 B2 * | 1/2012 | Miyashita et al. | 369/59.22 |
| 2004/0013074 A1 | 1/2004 | Lee et al. | |
| 2007/0019533 A1 | 1/2007 | Ogawa et al. | |
| 2009/0175151 A1 | 7/2009 | Miyashita et al. | |

FOREIGN PATENT DOCUMENTS

| | | |
|---|---|---|
| JP | 2001-006293 | 1/2001 |
| JP | 2004-146066 | 5/2004 |
| JP | 2005-528726 | 9/2005 |
| JP | 2006-031907 | 2/2006 |
| JP | 2006-519456 | 8/2006 |
| JP | 2007/026617 | 2/2007 |
| JP | 2008-140444 | 6/2008 |
| JP | 2008-524769 | 7/2008 |
| WO | WO 2006/038633 A1 | 4/2006 |
| WO | WO 2006/067732 A1 | 6/2006 |
| WO | 2009/066470 | 5/2009 |

* cited by examiner

BCA: Burst Cutting Area
PIC: Permanent Information & Control data

| BP X | bit7 to 4 | bit3 to 0 | |
|---|---|---|---|
| | Reserve | Density | |
| | 0000b | 0000b | 25GB/layer density disc |
| | | 0001b | 33GB/layer density disc |
| | | 0010b to 1111b | Reserved (all to 0b) |

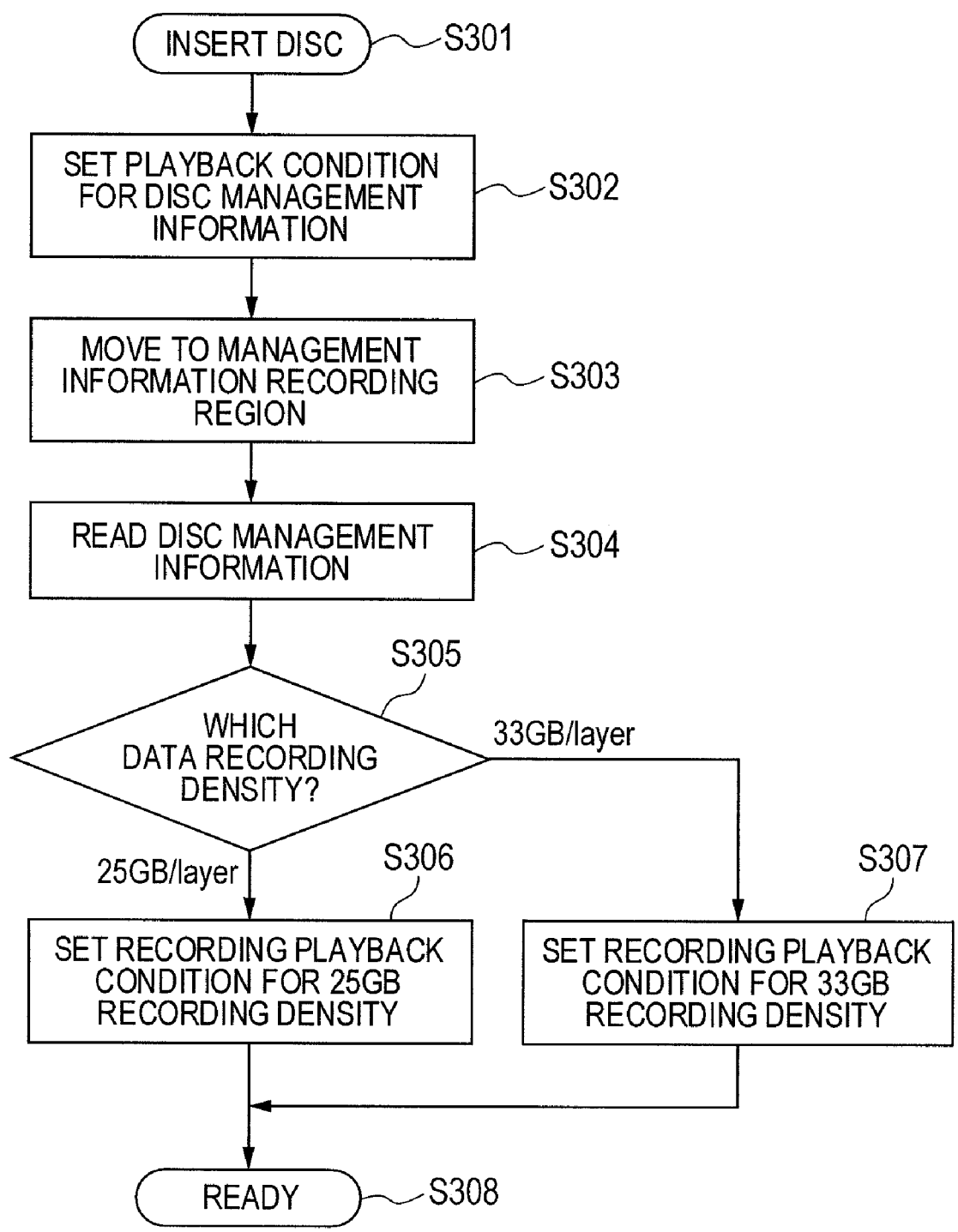

FIG. 6A
Type C
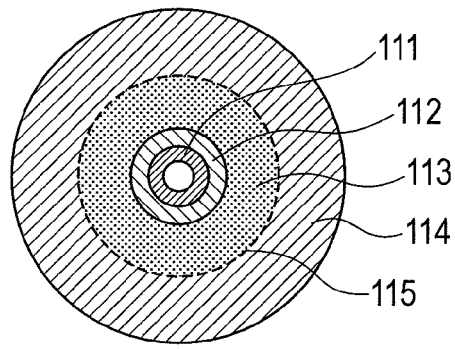
FIG. 6B
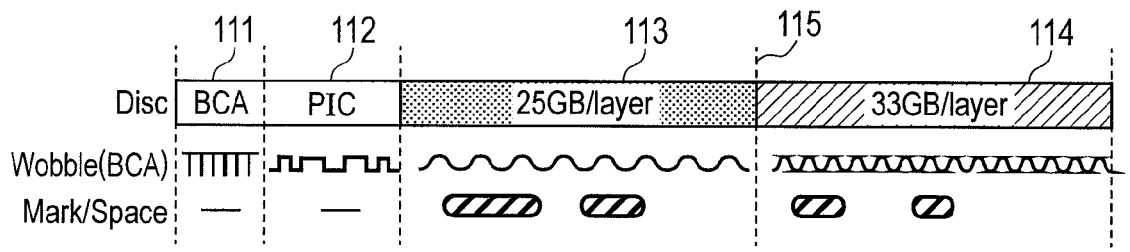
FIG. 7
| | bit7 to 4 | bit3 | bit2 to 0 | |
|---|---|---|---|---|
| | Reserve | Hybrid | Density | |
| BP0 | 0000b | 0b | 000b | All area 25GB/layer density disc |
| | | | 001b | All area 33GB/layer density disc |
| | | | 010b to 111b | Reserved (all to 0b) |
| | | 1b | 000b | Hybrid Disc of 25GB/layer density and 33GB/layer density |
| | | | 001b to 111b | Reserved (all to 0b) |
| BP1 to 4 | Boundary Address of Differential density area | | | |

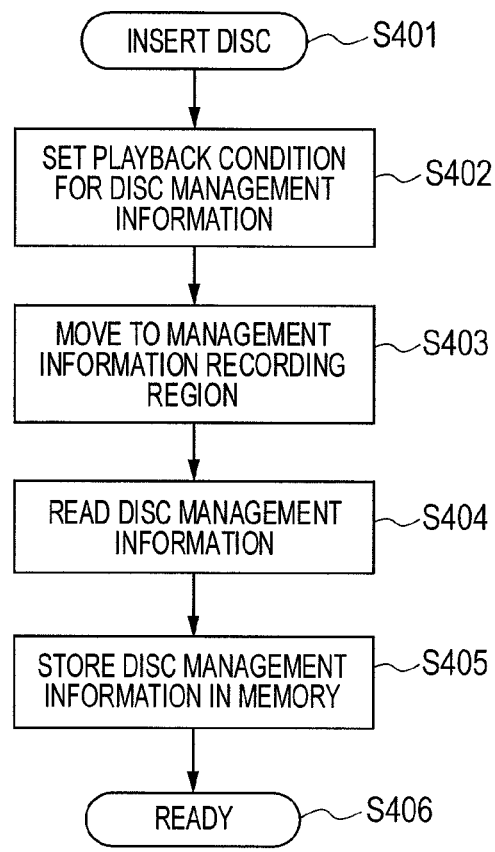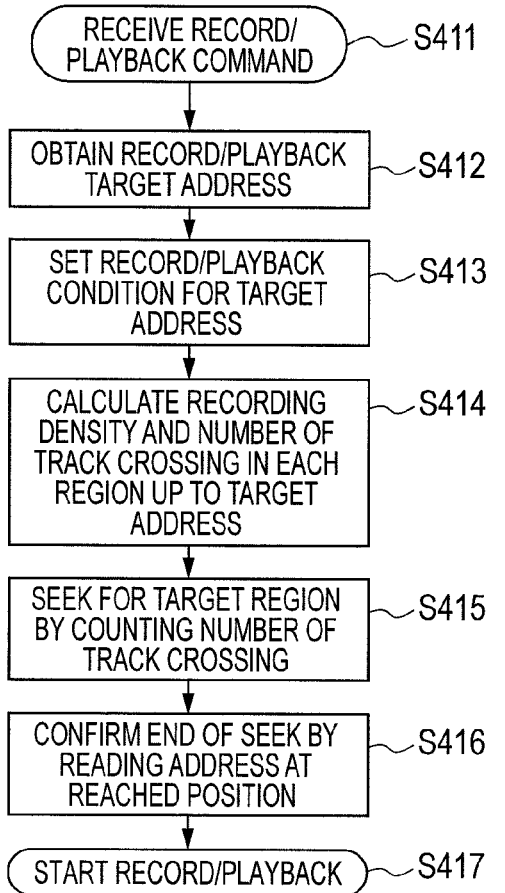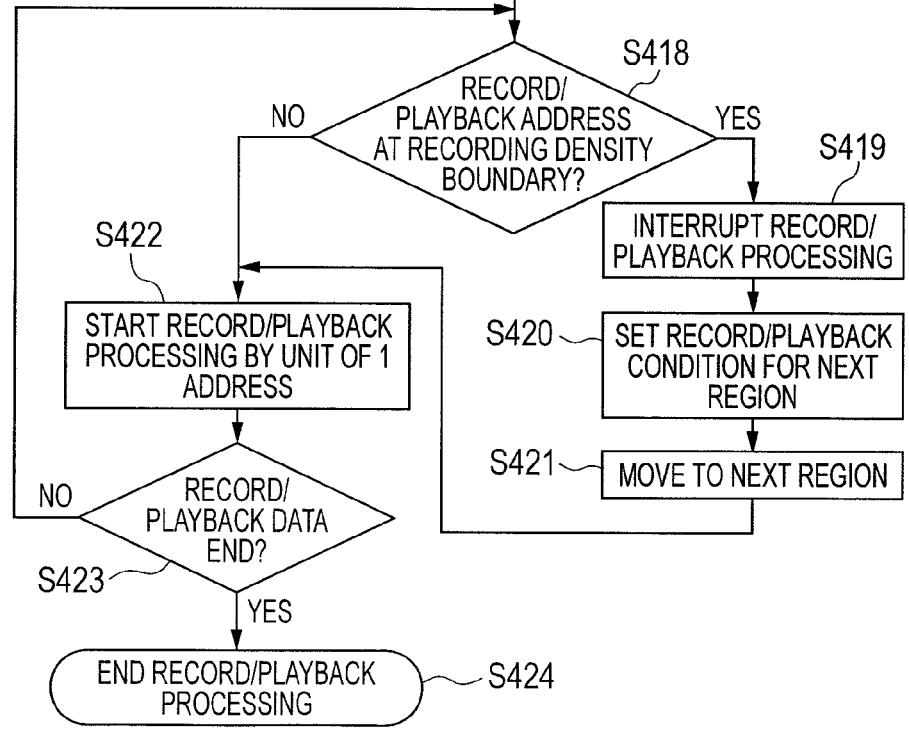
FIG. 10A
FIG. 10B

| | bit7 to 6 | bit5 to 4 | bit3 to 2 | bit1 to 0 |
|---|---|---|---|---|
| BP18 | Layer 3 density | Layer 2 density | Layer 1 density | Layer 0 density |
| BP19 | Layer 7 density | Layer 6 density | Layer 5 density | Layer 4 density | bit assign    00b ...25GB/layer
              01b ...33GB/layer
              10b,11b ...Reserved

OPTICAL DISC, OPTICAL DISC RECORDING/PLAYBACK APPARATUS, AND INFORMATION RECORDING/PLAYBACK METHOD

TECHNICAL FIELD

The present invention relates to an optical disc for recording information with plural kinds of data recording densities, an optical disc recording/playback apparatus, and an information recording/playback method.

BACKGROUND ART

An optical disc capable of recording large volume of data with high density has been developed to further make the capacity higher by forming the recording layer into a multi-layer structure. For example, the approach has been taken to use four layers each with standard recording density of 25 GB/layer and three layers each with high recording density of 33 GB/layer for forming the blue ray disc (BD). The use of the optical disc with different recording formats including the recording density requires the optical disc apparatus for performing recording/playback in accordance with the identified format.

Patent Document 1 discloses the related technology as the structure for selecting the optical system (numerical aperture, NA) in accordance with the disc type, and further changing property of the signal processing system in association with the selection. In the case where the single disc has plural recording layers each recorded in accordance with a different format, the structure disclosed in Patent Document 2 records the format information of plural recording layers in the lead-in area so as to identify each format of the respective recording layers.

RELATED ART DOCUMENTS

Patent Documents

Patent Document 1: JP-A No. 282785/1997
Patent Document 2: JP-A No. 26617/2007

SUMMARY OF THE INVENTION

Problem to be Solved by the Invention

Two kinds of data recording densities, that is, generally employed standard density (25 GB/layer) and a high density (33 GB/layer) are proposed as candidates for the use in the BD multi-layer disc. In this case, the wavelength and the numerical aperture (NA) of the blue laser are set to 405 nm and 0.85, respectively in accordance with any of the formats. It is therefore difficult to identify the format based on the reflectance of the disc surface. The technology as disclosed in Patent Document 1 is not capable of identifying the disc, thus failing to perform the playback.

As the technology disclosed in Patent Document 2 is used for identifying the multi-layer disc having two kinds of formats (HD_DVD and DVD) co-existed, the format information for each layer (layer format table) is recorded in the lead-in area (System/Data Lead in Area) and a BCA (Burst Cutting Area). However, use of the technology causes the following disadvantages.

(1) The format information by itself is recorded in the lead-in area depending on the format of the layer to which the lead-in area belongs. In order to read the information from the lead-in area, the corresponding format has to be known. However, if the correlation between the layer and the format is not set, the reading of the information in the lead-in area is likely to fail.

(2) If the area for recording the format information (disc management information area) is expected to perform recording in accordance with the high density format, the apparatus adapted only for the generally employed standard density (=low density) is not capable of performing the reading, thus failing to identify the disc.

(3) Preferably in the multi-layer disc, the layer availability information is managed together with each format for the respective layers. In such a case, the format information has to be made recordable after manufacturing of the disc. The lead-in area and the BCA disclosed in Patent Document 2 are formed upon manufacturing of the disc, which cannot record such information after manufacturing of the disc.

It is an object of the present invention to provide an optical disc which is capable of easily reading management information of a disc for recording data with plural kinds of data recording densities with no error, an optical disc recording/playback apparatus, and an information recording/playback method.

Means for Solving the Problems

An optical disc for recording information with predetermined recording density according to the invention includes a data recording area for recording the information; and a management information recording area for recording disc management information which includes the information with respect to the recording density of data in the data recording area. The disc management information is recorded in the management information recording area in accordance with a specific format which is not dependent on the data recording density of the data recording area.

According to the invention, an optical disc capable of recording information with plural recording densities includes plural data recording areas which are divided and disposed in a same plane for recording the information with different data recording densities, and a management information recording area for recording disc management information which includes the data recording densities of the plural data recording areas and information of a boundary position in the respective data recording areas. The disc management information is recorded in the management information recording area in accordance with a specific format which is not dependent on the respective data recording densities of the plural data recording areas.

According to the invention, an optical disc which is provided with plural recording layers and capable of recording information with plural recording densities includes plural data recording areas for recording the information with different data recording densities corresponding to the respective recording layers, and a management information recording area for recording disc management information which includes the information with respect to the data recording densities corresponding to the data recording areas of the respective recording layers. The disc management information is recorded in the management information recording area in accordance with a specific format which is not dependent on the respective data recording densities of the plural data recording areas.

According to the invention, an optical disc which is provided with plural recording layers and capable of recording information with plural recording densities includes plural data recording areas for recording the information with different data recording densities corresponding to the respective recording layers, and a management information recording area for recording disc management information which includes the respective data recording densities corresponding to the plural data recording areas. The management information recording area is arranged in a part of the data recording area with a standard data recording density among the plural data recording areas for recording the disc management information in accordance with a format with the data recording density of the area.

The invention provides an optical disc recording/playback apparatus for performing recording or playback of information in a data recording area of an optical disc, in which disc management information which includes the information of a data recording density of the data recording area is recorded in the management information recording area of the optical disc in accordance with a specific format which is not dependent on the data recording density of the data recording area. The apparatus includes a spindle motor for rotating the optical disc, an optical head for reading the disc management information from the management information recording area of the optical disc, and performing recording or playback of the information in the data recording area of the optical disc, a recording/playback processing unit for processing a recording signal to be supplied to the optical head or a playback signal from the optical head, and a recording density determination circuit for determining a data recording density of a target data recording area based on the disc recording information read by the optical head. The recording/playback processing unit selects and sets a recording/playback processing condition in accordance with the data recording density determined by the recording density determination circuit.

The invention provides an information recording/playback method of performing recording or playback of information in a data recording area of an optical disc. A management information recording area of the optical disc has disc management information which includes data recording density of the data recording area recorded in accordance with a specific format which is not dependent on the data recording density of the data recording area. The method includes the steps of setting a playback condition for performing playback of the disc management information in accordance with the specific format, reading the disc management information from the management information recording area of the optical disc, determining with respect to a data recording density of a target data recording area from the read disc management information, selecting and setting a recording/playback processing condition in accordance with the determined data recording density, and performing recording or playback of the information in the target data recording area in accordance with the set recording/playback processing condition.

Advantages

The invention allows the disc management information of the optical disc for recording data with plural kinds of data recording densities to be easily read with no error. The apparatus adaptable only to the generally employed disc with standard recording density is allowed to execute the disc identification, thus improving user convenience.

BRIEF DESCRIPTION OF THE DRAWINGS

FIG. 5 is a flowchart representing a recording/playback processing procedure according to the first embodiment.

FIG. 6 illustrates an exemplary recording layout of the optical disc (type C) according to a second embodiment.

FIG. 7 represents an exemplary description of the disc management information recorded in the disc according to the second embodiment.

FIG. 10 is a flowchart representing a recording/playback processing procedure according to the second embodiment.

EMBODIMENTS FOR CARRYING OUT THE INVENTION

Figures 1, 2:
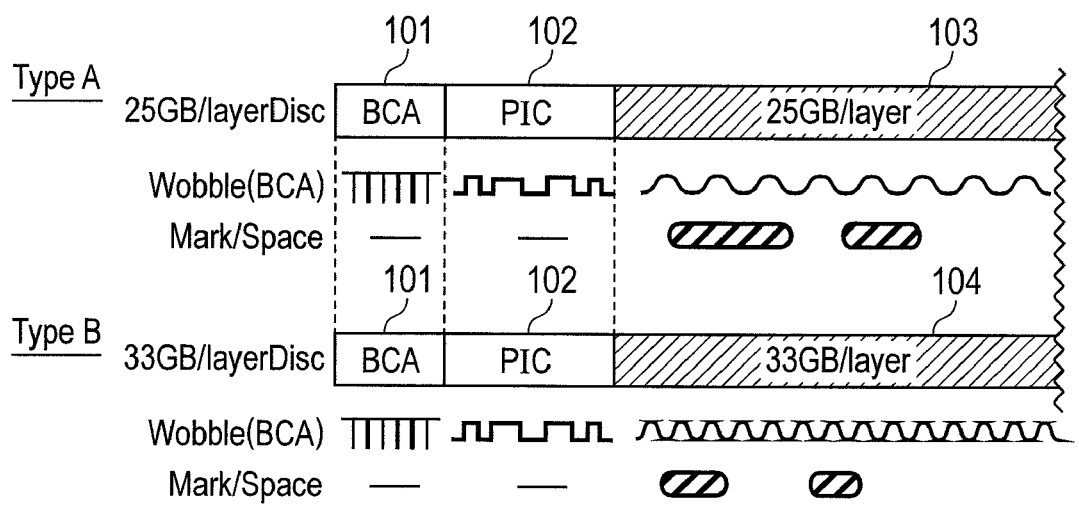
FIG. 1 illustrates an example of a recording layout of an optical disc (type A, type B) according to a first embodiment.
FIG. 2 represents an exemplary description of disc management information recorded in the disc according to the first embodiment.

The best modes for carrying out the invention will be described referring to the drawings.

First Embodiment

An embodiment provides a multi-layer blue ray disc (BD) as a disc, all the layers of which exhibit standard data recording density (25 GB/layer) (hereinafter referred to as type A), or as a disc, all the layers of which exhibit high data recording densities (33 GB/layer) (hereinafter referred to as type B). The number of the layers may be set to 4 each with 25 GB/layer and to 3 each with 33 GB/layer. In both cases, the entire capacity of the disc is set to 100 GB. The method for identifying the disc between type A and type B, and the processing method for the recording/playback apparatus will be described.

Table 1 represents main specifications of the recording formats of the discs of types A and B. The disc of type A (25 GB/layer) has the minimum mark length set to 0.149 μm, and the track pitch set to 0.32 μm, and the disc B has the minimum mark length set to 0.113 μm, and the track pitch set to 0.32 μm, respectively. Each of those discs has the same modulation rule of the recording information signal, data on the disc, addressing and the disc format such as wobble in synchronization therewith. Accordingly, each of the channel clock frequency and the wobble frequency is different. Upon recording/playback, the processing condition has to be selected in accordance with change in the aforementioned values. In other words, the playback signal level with respect to the minimum mark length, the playback equalizer and the recording strategy conditions with respect to the clock frequency, and the address playback condition with respect to the wobble frequency are selected.

TABLE 1

|  | 25 GB/ layer | 33 GB/ layer | Related matter |
| --- | --- | --- | --- |
| Minimum mark length [μm] | 0.149 | 0.113 | Signal characteristic |
| Channel clock frequency [MHz] | 66 | 87.1 | Read Condition(EQ etc) Write Condition(Strategy etc) |
| Wobble frequency [kHz] | 956.5 | 1262.6 | Address reproduction |

FIG. 1 illustrates an example of each recording layout of the optical disc (types A and B).

Each disc of types A and B includes a BCA (Burst Cutting Area) area 101, a PIC (Permanent Information & Control data) area 102, and data recording areas 103, 104 disposed from the inner periphery of the disc. The BCA area 101 records information as the barcode with the thickness ranging from 4 to 17 μm at an interval of 28.6 μm at the center of the disc, which has the recording density independent from that of the data recording area. After disc manufacturing, they are recorded by burning the reflective film using strong infrared laser called YAG laser. The area serves to write the required information of the manufacturer after manufacturing of the disc, for example, serial IDs for identifying the respective discs, and coded information. The PIC area 102 serves as a management information area of the BD, which is formed of high frequency groups (HFM group) defined by integral multiple of the channel clock. In the HFM group area, the data information such as pit and mark is not recorded in accordance with the disc format, and accordingly, the group frequency may be set independent from the recording density of the data area. They are formed by the stamper and the like upon manufacturing of the disc together with the wobble (groove) in the data area. This allows writing of the laser power value required for recording/playback which is predetermined upon manufacturing of the disc. The data recording areas 103 and 104 record information (data) with recording densities of 25 GB/layer and 33 GB/layer, respectively.

In the embodiment, upon the disc manufacturing, the disc management information data with respect to the data recording density of the BCA area 101 or PIC area 102, and further the data recording areas 103 and 104 are recorded. Each of the BCA area 101 and the PIC area 102 has the same format unique to the disc of type either A or B. The disc management information, thus, may be recorded with the specific recording density in accordance with the format. In other words, the recording density for writing the disc management information is not dependent on the data recording densities of the data recording areas 103 and 104 in the disc.

FIG. 2 represents an exemplary description of the disc management information (data recording density information) in the discs of types A and B, specifically an example of the bit arrangement for writing the density information. The description defines the recording density 25 GB/layer (type A) as "0000" bit, and the recording density 33 GB/layer (type B) as "0001" bit. The recording density of the disc may be determined by identifying the above defined bit value.

Figure 3:
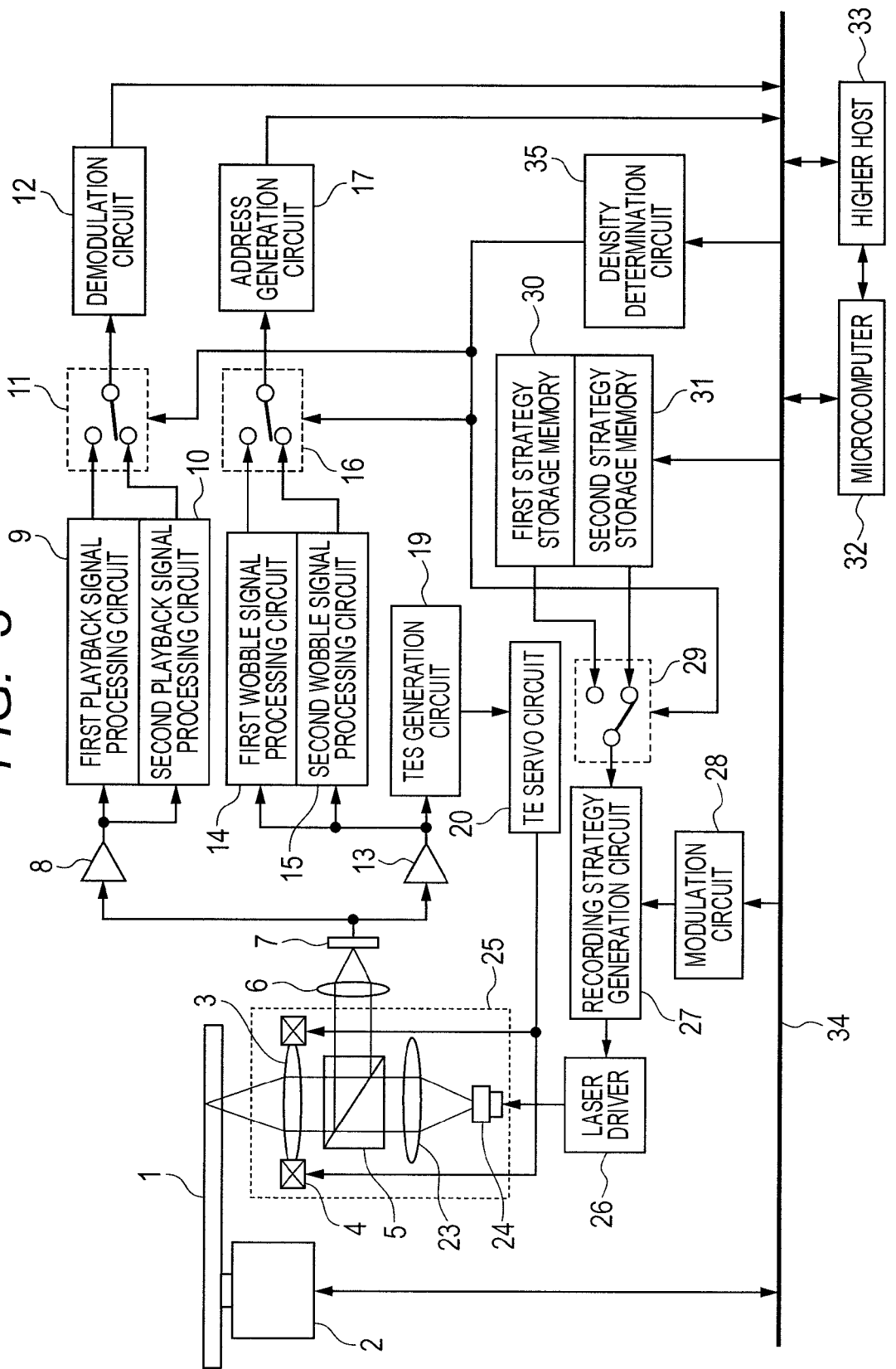
FIG. 3 illustrates an exemplary structure of the optical disc recording/playback apparatus according to the first embodiment.

FIG. 3 illustrates an exemplary structure of the optical disc recording/playback apparatus according to the embodiment.

Main components will be described. A code 1 denotes an optical disc (corresponding to the BD shown in FIG. 1), 2 denotes a spindle motor for rotating the optical disc, and 25 denotes an optical head. The optical head 25 irradiates a laser light ray (blue laser with the wavelength around 405 nm) to the optical disc 1 to read the disc management information, and performs recording/playback of the information in the data recording areas 103 and 104 of the optical disc 1. A density determination circuit 35, first and second playback signal processing circuits 9, 10, first and second wobble signal processing circuits 14, 15, and first and second strategy storage memories 30, 31 are provided for the purpose of coping with the plural data recording densities. A microcomputer 32 controls reading of the disc management information, setting of the recording/playback processing circuit, and execution of the recording/playback operation.

In the embodiment, the disc management information is read from the BCA area 101 or the PIC area 102 of the optical disc so as to determine the density information of the subject disc (25 GB/layer or 33 GB/layer) using the density determination circuit 35. In accordance with the determination result, selection is made between the first and the second playback signal processing circuits 9 and 10 to demodulate the playback signal using the demodulation circuit 12. Selection is made between the first and the second wobble signal processing circuits 14 and 15 to perform playback of the recording/playback address using an address generation circuit 17. Selection is made between the first and the second strategy storage memories 30 and 31 to generate the recording signal using the recording strategy generation circuit 27. The selection between the playback signal processing circuits 9 and 10 is made for setting a playback equalizer in accordance with the minimum mark length and the clock frequency. The selection between the wobble signal processing circuits 14 and 15 is made for setting the address playback in accordance with the wobble frequency. The selection between the strategy storage memories 30 and 31 is made for setting the recording strategy in accordance with the clock frequency.

Figure 4:
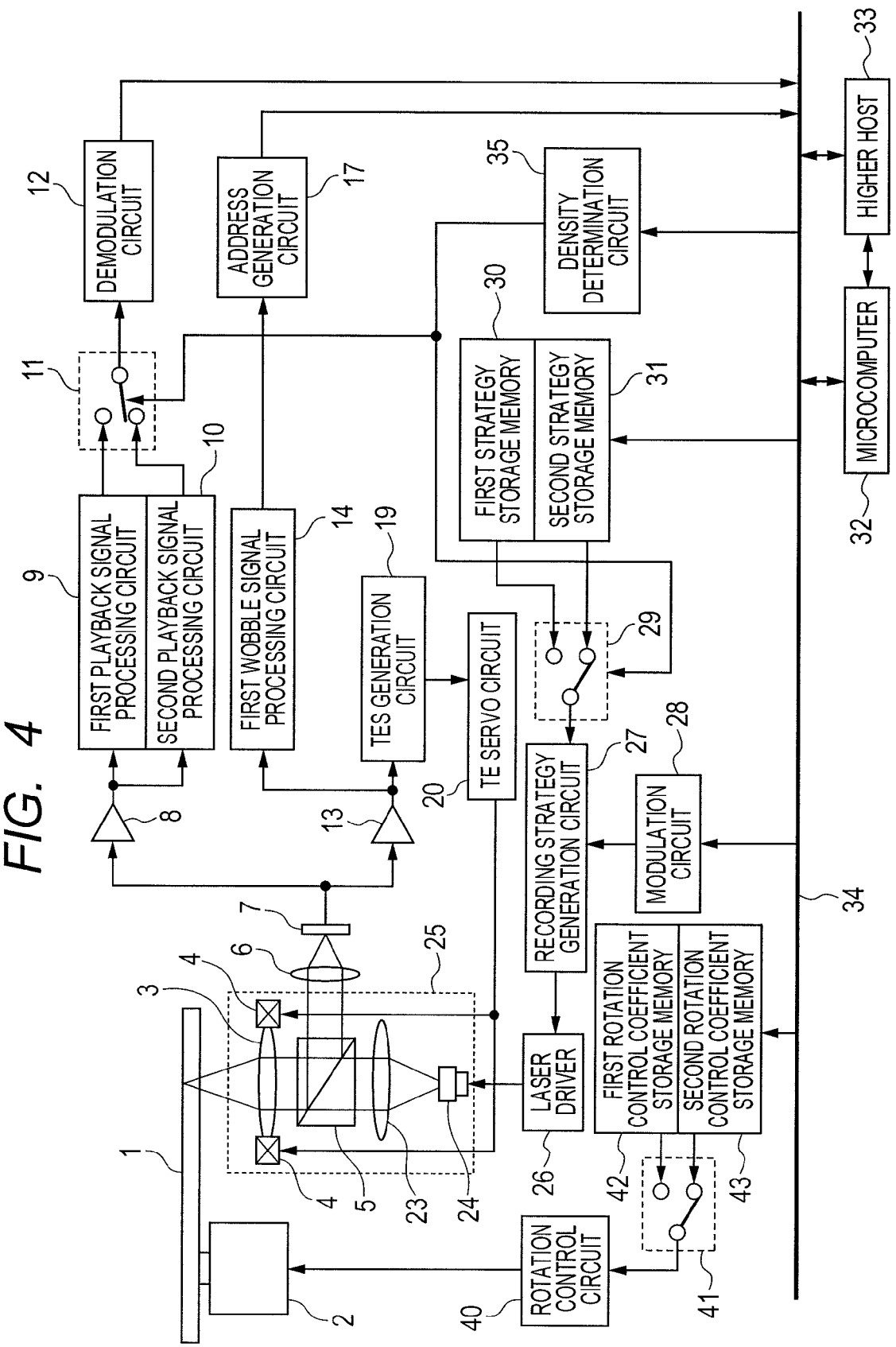
FIG. 4 illustrates another exemplary structure of the optical disc recording/playback apparatus according to the first embodiment.

FIG. 4 illustrates another exemplary structure of the optical disc recording/playback apparatus. This structure is formed by adding a rotation control circuit 40 for controlling rotation of the spindle motor 2, and first and second rotation control coefficient storage memories 42, 43 to the structure shown in FIG. 3, while removing the first and the second wobble signal processing circuits 14, 15 from the structure shown in FIG. 3. The density determination circuit 35 is used for determining the density information of the subject disc (25 GB/layer or 33 GB/layer) so as to perform selection between the rotation control coefficient storage memories 42 and 43. This makes it possible to change the rotating speed of the disc in accordance with the density, and keep the wobble frequency subjected to playback constant.

FIG. 5 is a flowchart representing the recording/playback processing procedure according to the embodiment.

In S301, the disc is loaded into the optical disc apparatus. In this case, the disc is of either 25 GB/layer density type (type A) or 33 GB/layer density type (type B).

In S302, a playback condition is set for reading the disc management information (data recording density information) from the disc. In other words, the playback condition in accordance with the format of the BCA area 101 or the PIC area 102 is set.

In S303, the optical head is moved to the management information recording area (BCA area or PIC area) on the disc.

In S304, the disc management information is read from the management information recording area.

In S305, it is determined whether the disc is of 25 GB/layer density type (type A) or 33 GB/layer density type (type B) based on the read recording density information.

If it is determined that the disc is of 25 GB/layer density type (type A), the process proceeds to step S306 where the recording/playback processing condition (playback signal processing circuit, wobble signal processing circuit, recording strategy) for the 25 GB/layer density type is set.

If it is determined that the disc is of 33 GB/layer density type (type B), the process proceeds to step S307 where the recording/playback processing condition (playback signal processing circuit, wobble signal processing circuit, recording strategy) for the 33 GB/layer density type is set.

In S308, the process is kept standby until reception of the command for instructing recording or playback of the information from the host. Upon reception of the instruction, the recording/playback operation is performed under the condition set in S306 or S307.

In the embodiment, the disc management information is recorded in the BCA area or the PIC area in accordance with the specific format, and accordingly, the management information playback condition may be uniquely determined. When the disc with any recoding density is loaded, the recording density of the disc may be easily determined with no error. This makes it possible to perform the recording/playback operation in accordance with the determined recording density.

Second Embodiment

The disc of the embodiment has the standard density area (25 GB/layer) and the high density area (33 GB/layer) co-existed in the same plane (same layer) (hereinafter referred to as type C). For convenience, the single layer is employed. However, plural layers are available. The disc of type C may be used for performing recording/playback in both the generally employed apparatus for the standard density (25 GB/layer) and the high density apparatus for the high density (33 GB/layer).

FIG. 6 illustrates an example of the recording format for the optical disc (type C). FIG. 6(*a*) illustrates a planar structure and FIG. 6(*b*) illustrates a structure in a radial direction.

The disc of type C includes a BCA area 111, a PIC area 112, a first recording density area (25 GB/layer) 113, and a second recording density area (33 GB/layer) 114 disposed from the inner periphery side in the same plane. A code 115 denotes a boundary between the first recording density area 113 and the second recording density area 114. An unrecorded portion (gap area) with a predetermined width may be formed in the boundary 115 in the radial direction. The disc management information (data recording density information) is recorded in the BCA area 111 or the PIC area 112. As each of the BCA area 111 and the PIC area 112 has a unique format, the disc management information is recorded with the specific recording density. In other words, the recording density of the disc management information is not dependent on the data recording densities of the data recording areas 113 and 114 in the disc.

FIG. 7 represents an exemplary description of the disc management information (data recording density information) in the disc C, specifically, an example of the bit arrangement for writing the density information. The information contains an added item indicating whether or not plural recording densities exist (Hybrid), while writing the position information (address value) of the recording density boundary. If Hybrid="1", it indicates the hybrid disc (type C), and plural density information data and the boundary address value are written. If Hybrid="0", it indicates the single recording density (type A, type B). The types A, B, and C may be identified based on the description in FIG. 7.

Figure 8:
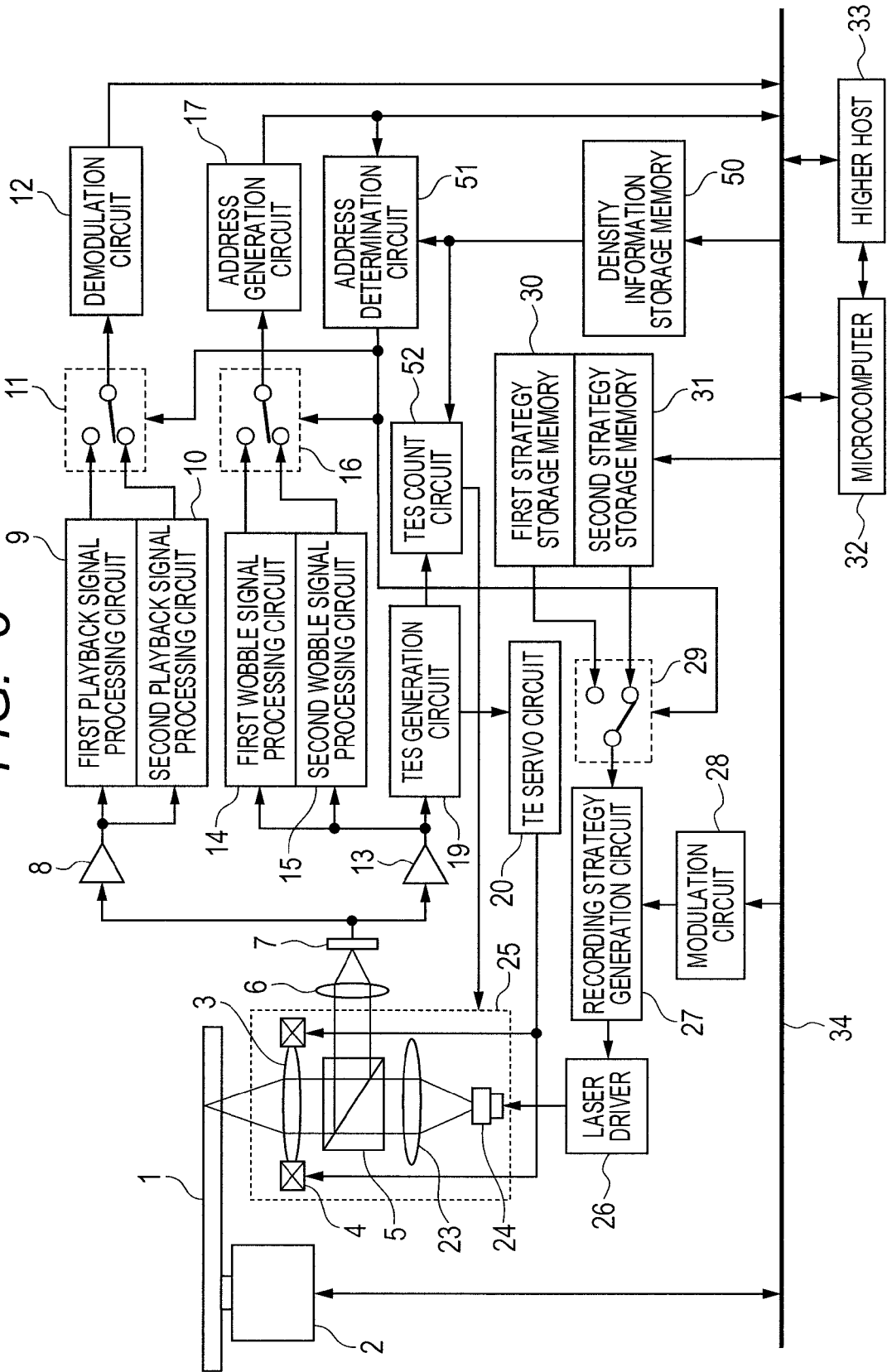
FIG. 8 illustrates an exemplary structure of the optical disc recording/playback apparatus according to the second embodiment.

FIG. 8 illustrates an exemplary structure of the optical disc recording/playback apparatus according to the embodiment. The structure of the embodiment is formed by adding a density information storage memory 50, an address determination circuit 51, and a track crossing number (TES) counter circuit 52 to the structure shown in FIG. 3.

The density information or the boundary address information read from the disc of type C is stored in the density information storage memory 50 so as to be referred by the address determination circuit 51. Upon reception of current address information from the address generation circuit 17, the address determination circuit 51 determines with respect to the density of the subject area (25 GB/layer or 33 GB/layer). Each selection is made between the first and the second playback signal processing circuits 9 and 10, the first and the second wobble signal processing circuits 14 and 15, and the first and the second strategy storage memories 30 and 31, respectively. The track crossing number up to the target area (target address) is calculated, and the track number is counted by the TES count circuit 52 to seek for the target area.

Figure 9:
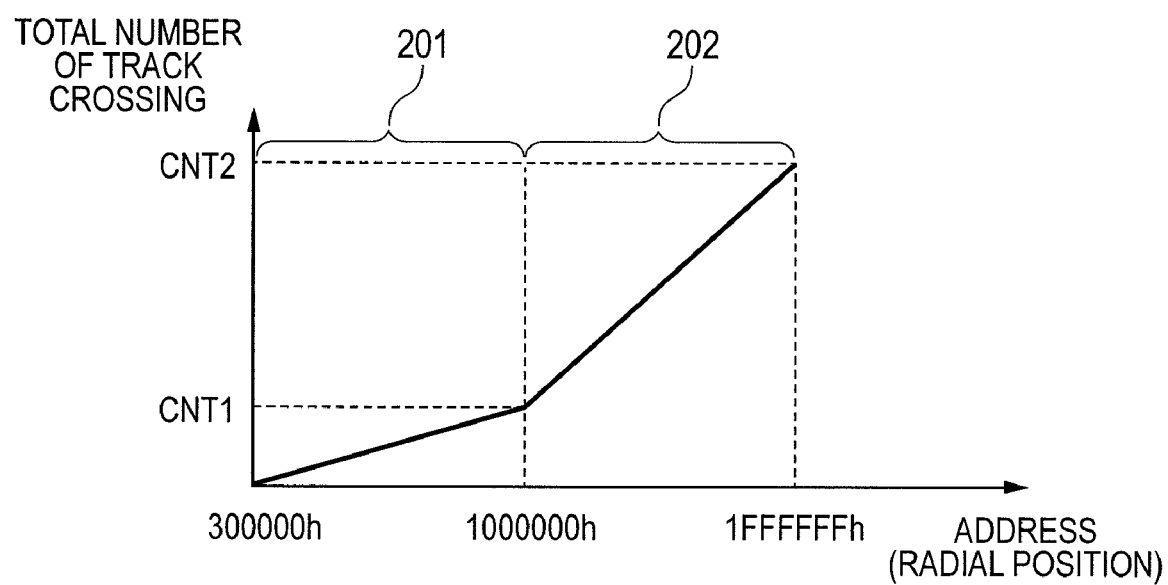
FIG. 9 represents a method for identifying address based on a track crossing number.

FIG. 9 represents an address determination method based on the track crossing number. An X-axis denotes an address value (radial position) and a Y-axis denotes a total number of track crossing (TES). A section 201 denotes an area of 25 GB/layer, and a section 202 denotes an area of 33 GB/layer. The boundary address is set to "1000000 h". The TES total number increases as the increase in the address. The resultant gradient depends on the recording density, and is different between the sections 201 and 202. The TES total number CNT1 is obtained when the boundary address is "1000000 h", and the number is counted by the TES count circuit 52 up to the CNT1 to allow the seeking operation for the boundary address. The track crossing number from the boundary is counted so that the target area (address) is reached.

FIG. 10 is a flowchart representing a recording/playback processing procedure according to the embodiment, wherein FIG. 10(*a*) represents the step executed when loading the disc, and FIG. 10(*b*) represents the step executed when processing the recording/playback.

In S401, the disc is loaded into the optical disc apparatus. In the embodiment, the disc is of type C having the standard density (25 GB/layer) area and the high density (33 GB/layer) area co-existed in the same plane.

In S402, the playback condition is set for reading the disc management information (data recording density information) from the disc. That is, the playback condition adapted to the format for the BCA area 111 or the PIC area 112 is set.

In S404, the disc management information is read from the management information recording area.

In S405, the disc management information (data recording density, density boundary address value) read from the management information recording area is stored in the density information storage memory 50.

In S406, the process is kept standby until reception of the command for instructing recording or playback of the information from the host.

The process then proceeds to the recording/playback process.

In S411, the command for recording or playback of the information is received from the host.

In S412, the target address for recording/playback is obtained from the received command.

In S413, the recording/playback condition at the target address is set based on the target address and the disc management information (data recording density, density boundary address value) stored in the density information storage memory 50. In other words, the recording/playback processing condition (playback signal processing circuit, wobble signal processing circuit, storage strategy) is set as the condition for 25 GB/layer or 33 GB/layer.

In S414, each recording density of the respective areas and the track crossing number (TES) up to the target address are calculated based on the target address and the disc management information stored in the density information storage memory 50.

In S415, the track crossing number is counted to seek for the target area.

In S416, the address at the incoming position is read to confirm the end of seek.

In S417, data recording/playback operation is started.

In S418, it is determined whether the recording/playback address coincides with the boundary address of the recording density. If it coincides with the boundary, the process proceeds to S419. If it does not coincide with the boundary, the process proceeds to S422.

In S419, the recording/playback operation is interrupted.

In S420, the recording density information of the next area is read from the density information storage memory 50, and the recording/playback processing condition (playback signal processing circuit, wobble signal processing circuit, recording strategy) corresponding to the read density is set.

In S421, the optical head is moved to the next recording density area.

In S422, the recording/playback process is performed by a unit of 1 address.

In S423, it is determined whether processing of all the recording/playback data have been finished. If it is determined that some data are kept unprocessed, the process proceeds to S418 where the process is continuously executed. If processing of the remained data has been finished, the process proceeds to S424 where the recording/playback process ends.

According to the embodiment, the disc management information (arrangement of the recording density, boundary address) is stored in the BCA area or the PIC area in accordance with the fixed format even in the disc (type C) having plural kinds of data recording densities co-existed in the same plane. Accordingly, the playback condition for the management information may be uniquely determined, thus allowing easy determination with no error. In accordance with the recording density at the target position in the disc, each recording/playback operation may be performed in accordance with the corresponding recording density.

Third Embodiment

In this embodiment, the multi-layer disc having the layer with the standard data recording density (25 GB/layer) and the layer with high data recording density (33 GB/layer) co-existed (hereinafter referred to as type D) is employed. The disc of type D may be employed for any of the generally employed apparatus adapted to the standard density (25 GB/layer) and the apparatus adapted to the high density (33 GB/layer) for performing recording/playback operation.

Figures 11, 12:
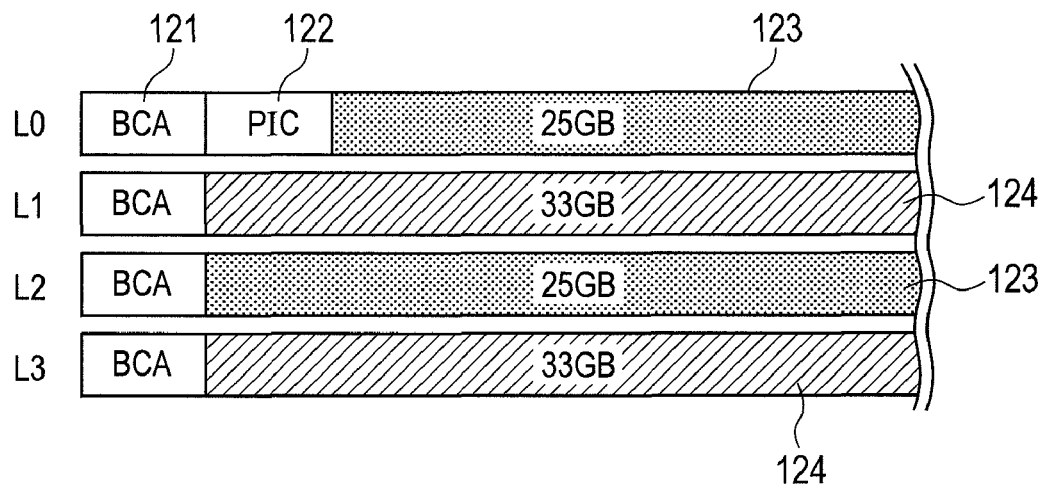
FIG. 11 represents an exemplary recording layout of the optical disc (type D) according to a third embodiment.
FIG. 12 represents an exemplary description of the disc management information of the disc according to the third embodiment.

FIG. 11 represents an exemplary recording format of the optical disc (type D), which includes four layers formed by alternately laminating the layers of 25 GB/layer and 33 GB/layer. The respective recording layers will be referred to L0, L1, L2 and L3 from the disc surface. Each of the layers includes a BCA area 121, a PIC area 122, and data recording areas 123, 124, which are arranged from the inner periphery. The data recording areas 123 and 124 of each layer record data with the recording density of 25 GB/layer or 33 GB/layer. The BCA area 121 exists in the respective layers, and the PIC area 122 exists only in the L0 layer. In the embodiment, the disc management information (data recording density information) is stored in the PIC area 122. As the PIC area 122 has the fixed format, the disc management information is recorded with the specific recording density. In other words, the recording density of the disc management information is not dependent on the data recording density of the adjacent data recording area 123. The recording density of the L0 layer with the PIC area 122 is constantly set to the standard value of 25 B/layer so as to be compatible to the generally employed apparatus for the standard density (25 GB/layer). Alternatively, the PIC area 122 may be provided in the recording layer having the data recording density minimized.

FIG. 12 represents an exemplary description of the disc management information (data recording density information) of the disc of type D, specifically an example of the bit arrangement for writing the density information. Description columns of recording densities for the respective layers are provided so that the data recording density is written by 2 bits. Referring to the drawing, the columns for 8 layers are provided to write the information with the recording density 25 GB/layer defined as "00" bit, and with the recording density 33 GB/layer defined as "01" bit, respectively.

Figure 13:
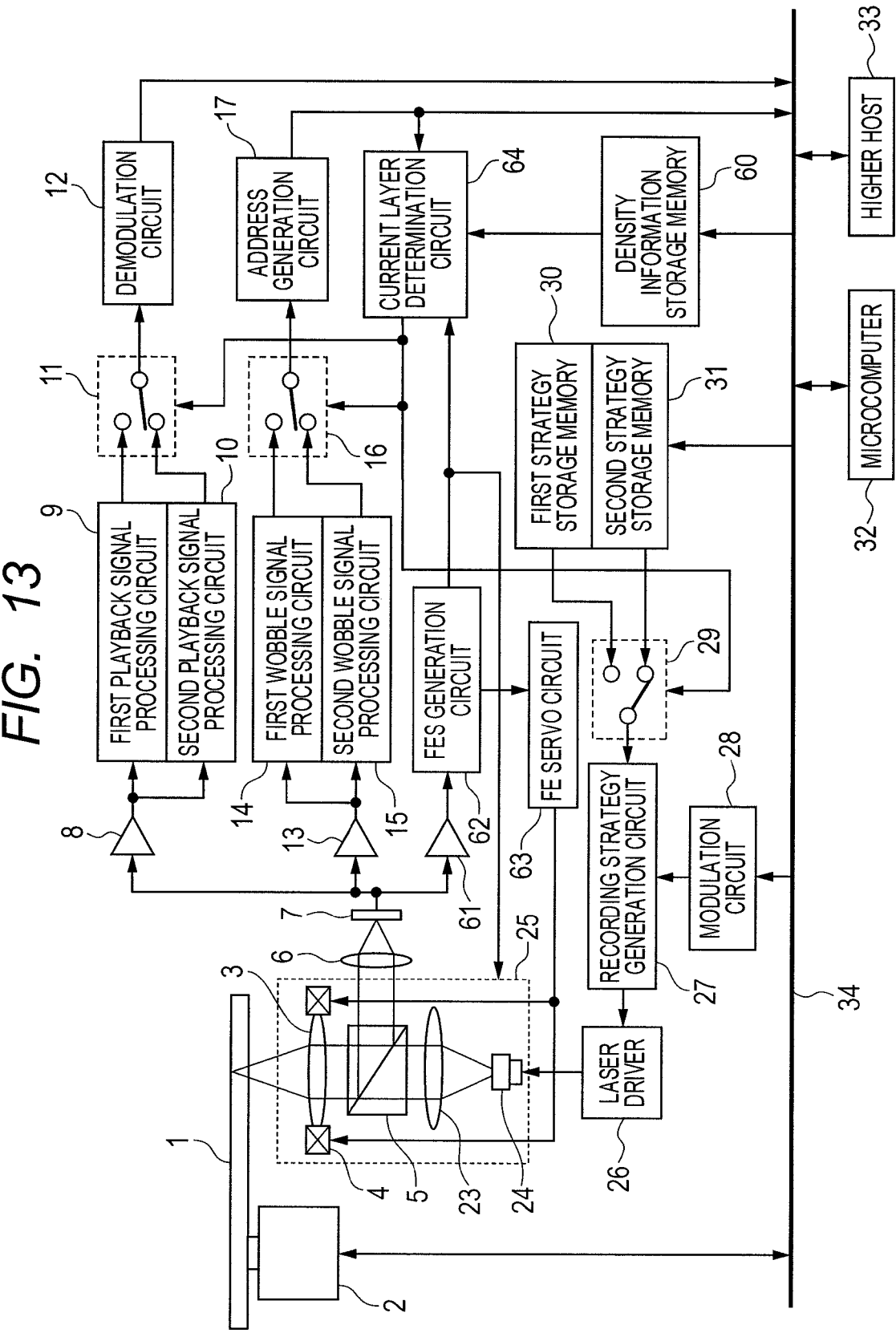
FIG. 13 illustrates an exemplary structure of an optical disc recording/playback apparatus according to the third embodiment.

FIG. 13 illustrates an exemplary structure of the optical disc recording/playback apparatus according to the embodiment. In the embodiment, the structure is formed by adding a density information storage memory 60, a focus error signal (FES) generation circuit 62, a focus error servo circuit 63, and a current layer determination circuit 64 to the structure shown in FIG. 3. The FES generation circuit 62 generates a crossing signal from the respective layers, and the focus error servo circuit 63 performs focus leading-in.

The density information of each layer read from the disc of type D is stored in the density information storage memory 60, and referred by the current layer determination circuit 64. The current layer determination circuit 64 receives inputs of an FE signal from the FES generation circuit 62 and a playback address from the address generation circuit 17 to determine the order of the current layer. It is determined with respect to the recording density (25 GB/layer or 33 GB/layer) of the current layer based on the density information from the density information storage memory 60. Selection between the first and the second playback signal processing circuits 9 and 10, the first and the second wobble signal processing circuits 14 and 15, and the first and the second strategy storage memories 30 and 31 will be performed in accordance with the determination results.

Figure 14A:
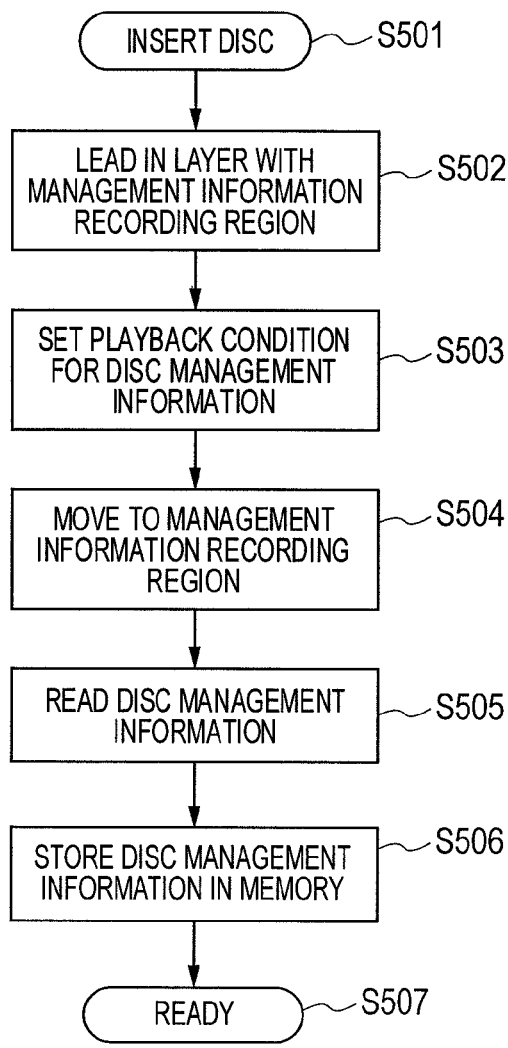
FIG. 14 is a flowchart representing a recording/playback processing procedure according to the third embodiment.
Figure 14B:
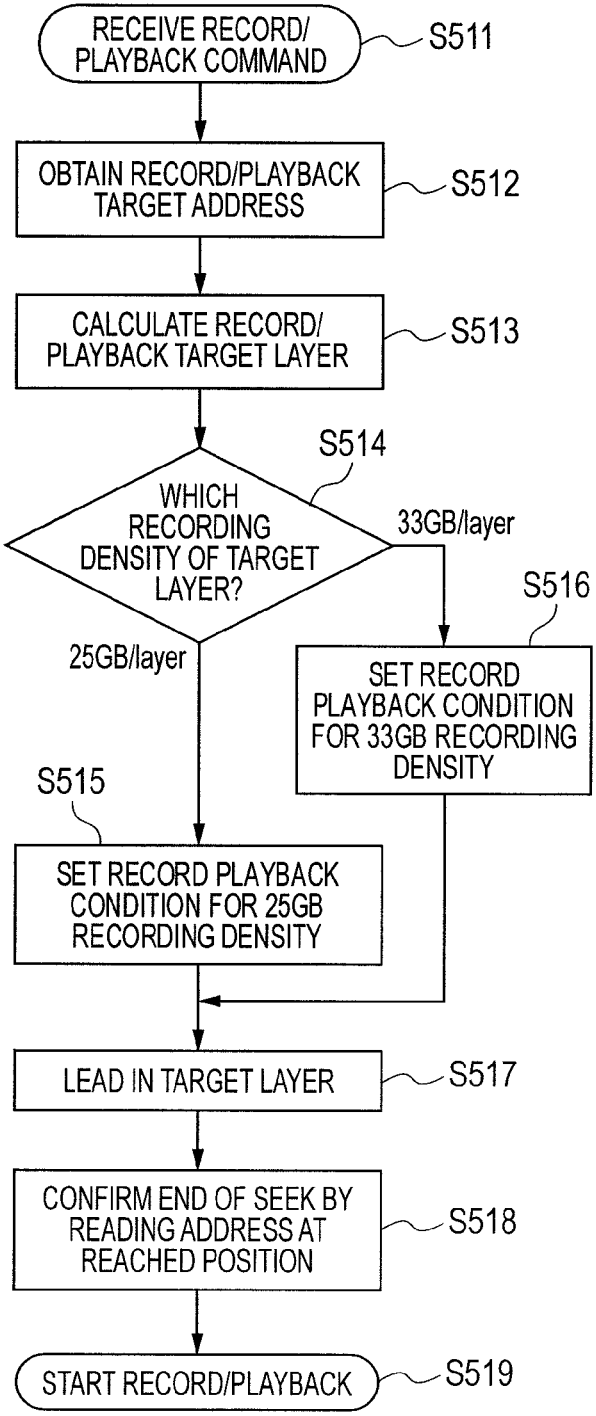

FIG. 14 shows flowcharts each indicating the recording/playback process procedure according to the embodiment, wherein FIG. 14(a) represents the step executed when loading the disc, and FIG. 14(b) represents the step executed when processing the recording/playback.

In S501, the disc is loaded into the optical disc apparatus. The multi-layer disc (type D) having the layer with standard density (25 GB/layer) and the layer with high density (33 GB/layer) co-existed is employed.

In S502, the focus of the optical head is led in the specific layer (L0 layer) in which the disc management information (data recording density information) is recorded.

In S503, the playback condition for reading the disc management information from the disc is set.

In S504, the optical head is moved to the management information recording area (PIC area 122) on the disc.

In S505, the disc management information is read from the management information recording area.

In S506, the disc management information (data recording density of each layer) read from the management information recording area is stored in the density information storage memory 60.

In S507, the process is kept standby until reception of the command for instructing the recording or playback of the information from the host.

The process proceeds to the recording/playback processing.

In S511, the command for recording or playback of the information is received from the host.

In S512, the target address subjected to the recording/playback is obtained from the received command.

In S513, the order of the target layer is calculated based on the target address subjected to the recording/playback.

In S514, the information stored in the density information storage memory 60 is referred to determine the recording density of the target layer.

In case of the recording density of 25 GB/layer, the process proceeds to S515 where the recording/playback processing condition (playback signal processing circuit, wobble signal processing circuit, storage strategy) for 25 GB/layer is set.

In case of the recording density of 33 GB/layer, the process proceeds to S516 when the recording/playback processing condition (playback signal processing circuit, wobble signal processing circuit, storage strategy) for 33 GB/layer is set.

In S517, the focus of the optical head is led in the target layer.

In S518, the address of the incoming position is read to confirm the end of seek.

In S519, the recording/playback operation starts.

According to the embodiment, the disc management information (each recording density of the respective layers) is recorded in the PIC area in accordance with the unique format even in case of the multi-layer disc (type D) having different data recording densities set in the respective layers. Then the management information playback condition may be uniquely determined, thus easily making determination with no error. In accordance with the recording density of the target layer in the disc, the recording/playback operation adapted to the corresponding recording density may be executed.

Fourth Embodiment

Likewise the third embodiment, this embodiment employs the multi-layer disc having the layers with the standard data recording density (25 GB/layer) and the layers with the high data recording density (33 GB/layer) co-existed. It is structured to record the disc management information (data recording density information) in a part of the data recording area of the layer with the standard density (25 GB/layer) (the disc will be referred to as type E). In this case, the management information is recorded using the data recording area, and accordingly, the information may be recorded after manufacturing the disc. For example, the disc manufacturer inspects the respective manufactured discs to determine existence of the unavailable layer. The determination result may be recorded while being included in the disc management information together with the recording density information for each layer.

Figure 15:
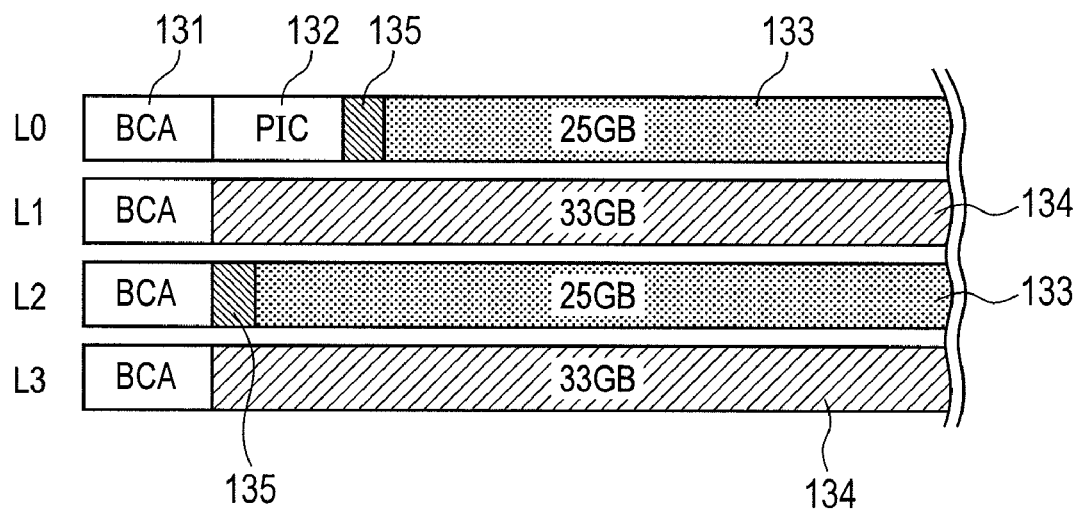
FIG. 15 represents an exemplary recording layout of the optical disc (type E) according to a fourth embodiment.

FIG. 15 illustrates an exemplary recording format for the optical disc (type E).

The disc includes four layers formed by alternately arranging the layers with 25 GB/layer and the layers with 33 GB/layer, which are referred to as L0, L1, L2 and L3 from the disc surface side, respectively. Those layers include BCA areas 131, a PIC area (only L0 layer), and data recording areas 133, 134 from the inner periphery side. A management information recording area 135 is partially formed in the data recording area 133 of each of the L0 and L2 layers. The management information is recorded in the area with the standard recording density so that the management information format is uniquely determined. This ensures the generally employed apparatus to read the management information. If the L0 layer is constantly set as the recording layer with the standard density (25 GB/layer), reading of the management information may further be ensured. Alternatively, the management information storage area 135 may be formed in the data recording area of the recording layer having the data recording density minimized.

The management information is recorded in the management information recording area 135 using an emboss pit and rewritable mark. The management information includes each data recording density of the respective layers as well as the layer availability information. For example, if the layer is available, the bit is set to "1", and if the layer is unavailable, the bit is set to "0".

Figure 16:
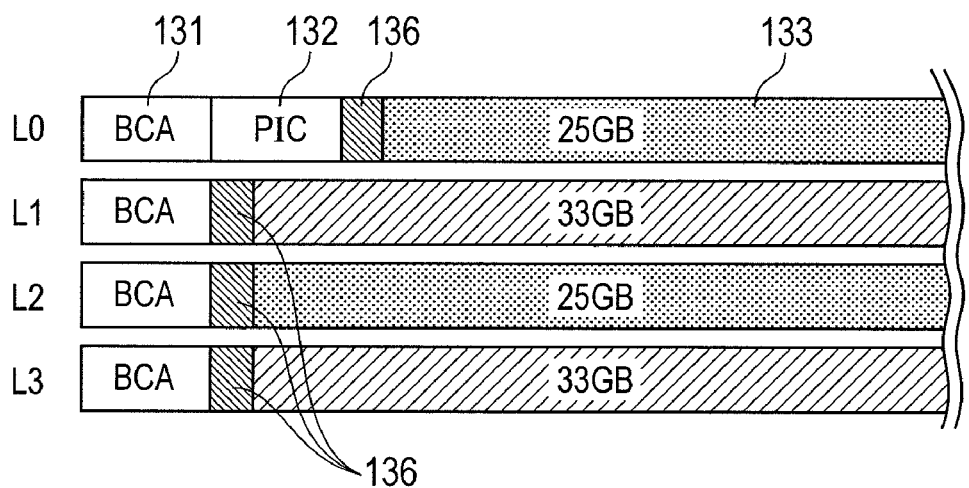
FIG. 16 represents another exemplary recording layout of the optical disc (type E') according to the fourth embodiment.

FIG. 16 illustrates another example of the recording format for the optical disc (type E). In this case, the optical disc will be referred to as type E' to be distinguished from the one shown in FIG. 15.

A management information recording area 136 is provided in each of all the layers in the case where the layer with the standard recording density (25 GB/layer) cannot be identified. In any of the areas, the management information is recorded in accordance with the format of the standard recording density (25 GB/layer) using the emboss pit and the rewritable mark.

The optical disc apparatus reads the disc management information (recording density information, availability information) when loading the disc, and stores the information in the density information storage memory. The recording/playback condition is selected in accordance with each recording density of the respective layers when performing the recording/playback. The recording/playback operation performed for the unavailable layer is interrupted to avoid wasted operation.

Figure 17:
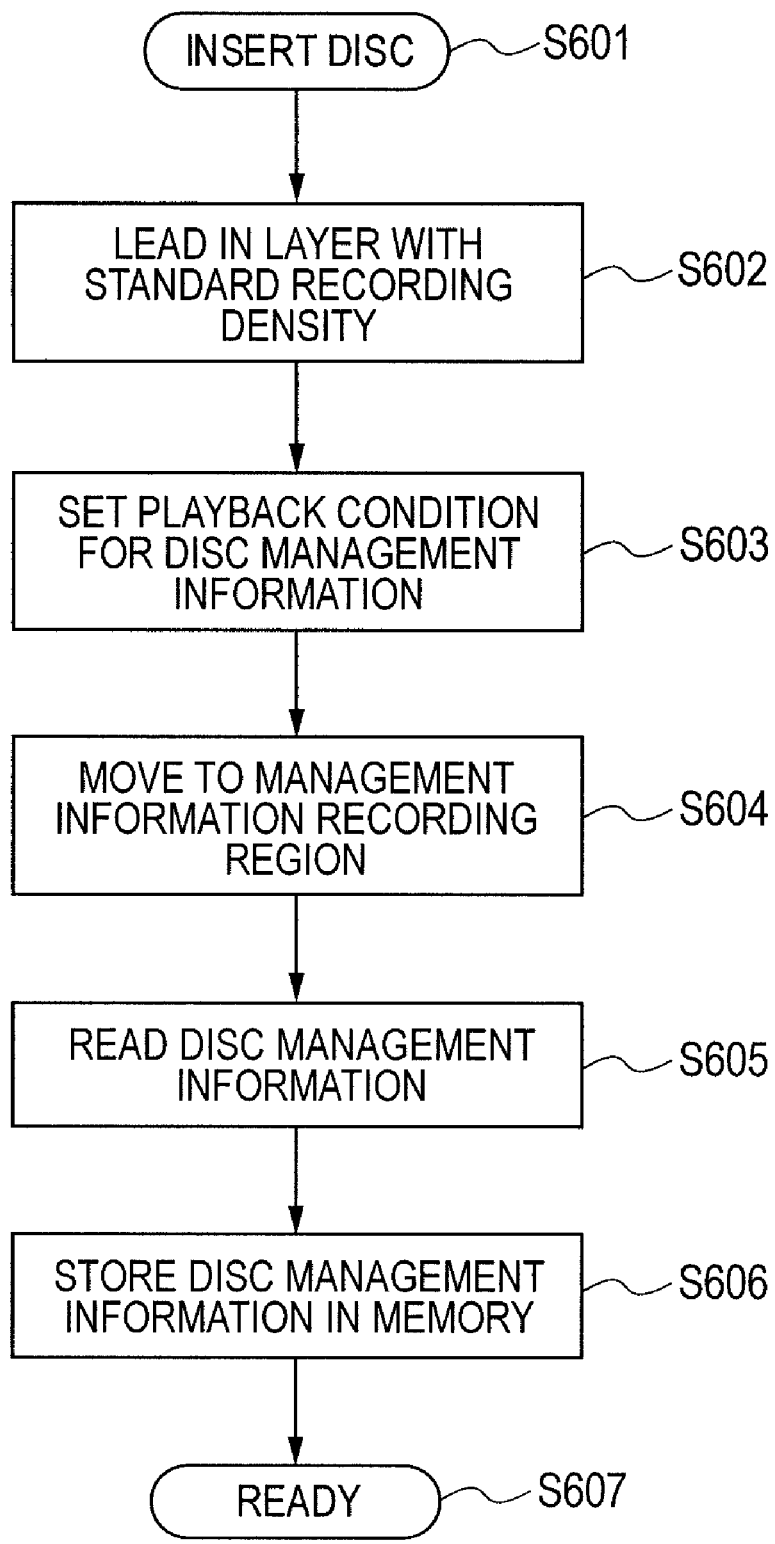
FIG. 17 is a flowchart representing a recording/playback processing procedure according to the fourth embodiment.

FIG. 17 is a flowchart representing the recording/playback processing procedure according to the embodiment, and specifically, the step executed when loading the disc.

In S601, the disc is loaded into the optical disc apparatus. The process employs the multi-layer disc (type E, type) having the layers with standard density (25 GB/layer) and those with high density (33 GB/layer) co-existed. The management information is recorded in the data recording area with the standard density (25 GB/layer).

In S602, the focus of the optical head is led in the layer with the standard density (25 GB/layer). In case of the disc shown in FIG. 15 (type E), it is led in the L0 layer or the L2 layer. In case of the disc shown in FIG. 16 (type E'), it may be led in any of the layers.

In S603, the playback condition for reading the disc management information from the disc is set. That is, the playback condition with the standard density (25 GB/layer) is set.

In S604, the optical head is moved to the management information recording areas 135 and 136.

In S605, the disc management information is read from the management information recording areas.

In S606, the read disc management information (recording density information, availability information) is stored in the density information storage memory 60.

In S607, the process is kept standby until reception of the command for instructing the recording or playback of the information from the host, and proceeds to the recording/playback processing upon reception of the command.

In the recording/playback step, the determination is made with respect to the recording density of the target layer, and selects the recording/playback condition in accordance with the recording density. If the target layer is unavailable, the recording/playback operation thereon is interrupted, and then the host will be informed of the interruption in need.

According to the embodiment formed as the multi-layer disc (type E, type E'), each layer of which has the different data recording density, the disc management information (each recording density of the respective layers, availability information) is recorded in accordance with the format with the standard density in a part of the data recording area with the standard density. Accordingly, the playback condition of the management information is uniquely determined, and the determination may be made with no error. The recording/playback operation in accordance with the corresponding recording density is performed in conformance to the recording density of the target layer in the disc. The availability information with respect to each of the respective recording layers is further referred so as to ensure to avoid the operation performed for the unavailable recording layer.

In the respective embodiments as described above, two kinds of the data recording densities, that is, 25 GB/layer and 33 GB/layer are employed. However, the recording density is not limited to the aforementioned example. Three or more kinds of data recording densities are applicable as well.

| | Description of Codes |
|---|---|
| 1 | optical disc |
| 2 | spindle motor |
| 9, 10 | playback signal processing circuit |
| 12 | demodulation circuit |
| 14, 15 | wobble signal processing circuit |
| 17 | address generation circuit |
| 25 | optical head |
| 27 | recording strategy generation circuit |
| 30, 31 | strategy storage memory |
| 32 | microcomputer |
| 35 | density determination circuit |
| 40 | rotation control circuit |
| 42, 43 | rotation control coefficient strategy memory |
| 50, 60 | density information storage memory |
| 51 | address determination circuit |
| 52 | track crossing number (TES) count circuit |
| 62 | focus error signal (FES) generation circuit |
| 64 | current layer determination circuit |
| 101, 111, 121, 131 | BCA (Burst Cutting Area) area |
| 102, 112, 122, 132 | PIC (Permanent Information & Control data) area |
| 103, 104, 113, 114, 123, 124, 133, 134 | data recording area |
| 135, 136 | management information recording area |

The invention claimed is:

1. An optical disc which is provided with plural recording layers and capable of recording information with plural recording densities, comprising:

plural data recording areas for recording the information with different data recording densities corresponding to the respective recording layers; and a management information recording area for recording disc management information which includes the respective data recording densities corresponding to the plural data recording areas, wherein the management information recording area is arranged in a part of the data recording area with a standard data recording density among the plural data recording areas for recording the disc management information in accordance with a format with the data recording density of the area.

2. The optical disc according to claim 1, wherein the disc management information which includes availability information of the recording layers is recorded in the management information recording layer.

3. An optical disc recording/playback apparatus for performing recording or playback of information in a data recording area of a first optical disc and a second optical disc, in which disc management information which includes the information of a data recording density of the data recording area is recorded in a management information recording area of the first and second optical discs in accordance with a specific format which is not dependent on the data recording density of the data recording area, comprising:

a spindle motor for rotating the optical disc;

an optical head for reading the disc management information from the management information recording area of the first and second optical discs, and performing recording or playback of the information in the data recording area of the first and second optical discs;

a recording/playback processing unit for processing a recording signal to be supplied to the optical head or a playback signal from the optical head; and a recording density determination circuit for determining a data recording density of a target data recording area based on the disc recording information read by the optical head;

wherein the first and second optical discs are subject to recording and playback with a laser of the same wavelength;

the data recording areas of the first and second optical discs have different recording densities, respectively; and the recording/playback processing unit selects and sets a recording/playback processing condition in accordance with the data recording density determined by the recording density determination circuit.

4. The optical disc recording/playback apparatus according to claim 3, wherein:

the optical disc has plural data recording areas which are divided and disposed in the same plane for recording the information with different data recording densities;

a density information storage memory is provided for storing the information with respect to each data recording density of the respective data recording areas and a boundary position from the disc management information read by the optical head;

an address determination circuit is provided for determining with respect to the data recording density of a target data recording area by referring the disc management information stored in the density information storage memory; and the recording/playback processing unit selects and sets a recording/playback processing condition in accordance with the data recording density of the next data recording area upon selection of the target data recording area to the other data recording area through determination of the address determination circuit.

5. The optical disc recording/playback apparatus according to claim 3, wherein:
the optical disc includes plural data recording areas which have plural recording layers and record the information with different data recording densities corresponding to the recording layers;
a density information storage memory is provided for storing the data recording density of the data recording area of the respective recording layers from the disc management information read by the optical head;
a current layer determination circuit is provided for determining with respect to the data recording density of the data recording area of a current layer by referring the disc management information stored in the density information storage memory; and
the recording/playback processing unit selects and sets a recording/playback processing condition in accordance with the data recording density of the data recording area of a next recording layer upon selection of a target data recording area to the data recording area of the other recording layer through determination of the current layer determination circuit.

6. The optical disc recording/playback apparatus according to claim 3,
wherein the recording/playback processing unit includes a playback signal processing circuit, a wobble signal processing circuit and a recording strategy generation circuit, and selects and sets a processing condition for each of the circuits in accordance with the data recording density.

7. An information recording/playback method of performing recording or playback of information in a data recording area of a first optical disc and a second optical disc, a management information recording area of the first and second optical discs having disc management information which includes data recording density of the data recording area recorded in accordance with a specific format which is not dependent on the data recording density of the data recording area, the method comprising the steps of:
setting a playback condition for performing playback of the disc management information in accordance with the specific format;
reading the disc management information from the management information recording area of the first and second optical discs;
determining with respect to a data recording density of a target data recording area from the read disc management information;
selecting and setting a recording/playback processing condition in accordance with the determined data recording density; and
performing recording or playback of the information in the target data recording area in accordance with the set recording/playback processing condition;
wherein the first and second optical discs are subject to recording and playback with a laser of the same wavelength; and
the data recording areas of the first and second optical discs have different recording densities, respectively.

8. The information recording/playback method according to claim 7, the optical disc having plural data recording areas divided and disposed in a same plane, and recording data with different data recording densities, further comprising the steps of:
storing each data recording density of the respective data recording areas from the read disc management information; and
selecting and setting the recording/playback processing condition in accordance with the data recording density of the next data recording area by referring the memory upon selection of the target data recording area to the other data recording area.

9. The information recording/playback method according to claim 7, the optical disc having plural data recording areas with plural data recording layers for storing data with different data recording densities corresponding to the respective recording layers, further comprising the steps of:
storing the data recording density of each data recording area of the respective recording layers based on the read disc management information in a memory; and
selecting and setting a recording/playback processing condition in accordance with the data recording density of the data recording area of the next recording layer by referring the memory upon selection of the target data recording area to the data recording area of the other recording layer.

10. An information recording/playback method for recording or playing back of information into or from data recording areas of first and second optical discs,
the first and second optical discs being subject to recording and playback with a laser of the same wavelength,
the data recording areas of the first and second optical discs having different recording densities, respectively,
disc management information including information of data recording densities of the data recording areas being recorded in a management information recording area of the first and second optical discs by using a unique format, the information recording/playback method comprising the steps of:
setting playback conditions for playing back the disc management information in accordance with the unique format;
reading out the disc management information from the management information recording area in the optical disc;
making a decision as to a data recording density on the basis of the disc management information read out;
selecting and setting recording/playback processing conditions for the first or second optical disc according to the data recording density obtained as a result of the decision; and
recording or playing back information under the set recording/playback processing conditions.

11. An information playback method for playing back of information from data recording areas of first and second optical discs,
the first and second optical discs being subject to recording and playback with a laser of the same wavelength,
the data recording areas of the first and second optical discs having different recording densities, respectively,
disc management information including information of data recording densities of the data recording areas being recoded in a management information recording area of the first and second optical discs by using a unique format, the information playback method comprising the steps of:

setting playback conditions for playing back the disc management information in accordance with the unique format;

reading out the disc management information from the management information recording area in the optical disc;

making a decision as to a data recording density on the basis of the disc management information read out;

selecting and setting playback processing conditions for the first and second optical disc according to the data recording density obtained as a result of the decision; and playing back information under the set playback processing conditions.

* * * * *